United States Patent [19]

Brazier

[11] 3,912,843

[45] Oct. 14, 1975

[54] FLEXIBLE PACKAGING FILM

[75] Inventor: Irvin L. Brazier, Milwaukee, Wis.

[73] Assignee: Milprint, Inc., Milwaukee, Wis.

[22] Filed: June 29, 1970

[21] Appl. No.: 50,614

[52] U.S. Cl. ............... 428/474; 426/415; 428/518; 428/910
[51] Int. Cl.² .................. B32B 27/34; B32B 27/32; B32B 27/30
[58] Field of Search ..... 99/171 LP; 117/7; 161/227, 161/247, 254, 402; 426/415

[56] References Cited
UNITED STATES PATENTS

| | | | |
|---|---|---|---|
| 3,370,972 | 2/1968 | Nagel et al. | 117/7 |
| 3,423,231 | 1/1969 | Lutzmann | 117/68.5 |
| 3,445,324 | 5/1969 | Curler et al. | 161/165 |
| 3,519,531 | 7/1970 | James et al. | 161/254 |
| 3,524,795 | 8/1970 | Peterson | 161/165 |
| 3,558,330 | 1/1971 | Widiger et al. | 99/174 |

Primary Examiner—Charles E. Van Horn
Assistant Examiner—Robert A. Dawson

[57] ABSTRACT

A multiple-layer flexible packaging film including layers of nylon, biaxially oriented polypropylene and a heat sealable polyolefin in which the polypropylene and the heat sealable polyolefin form exterior layers and the nylon is an interior layer positioned therebetween. A saran barrier layer is also included as an interior layer.

3 Claims, 3 Drawing Figures

U.S. Patent  Oct. 14, 1975  3,912,843
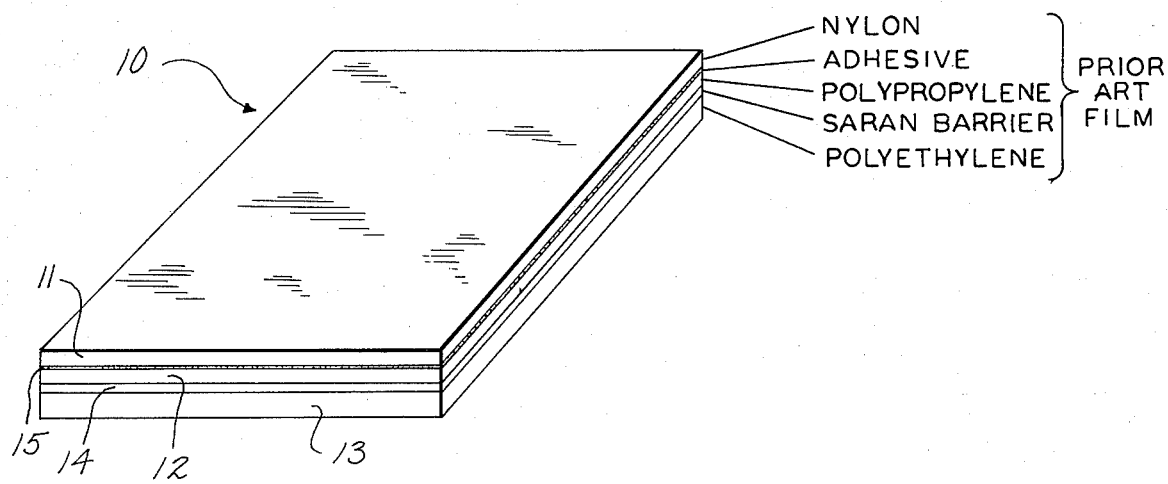
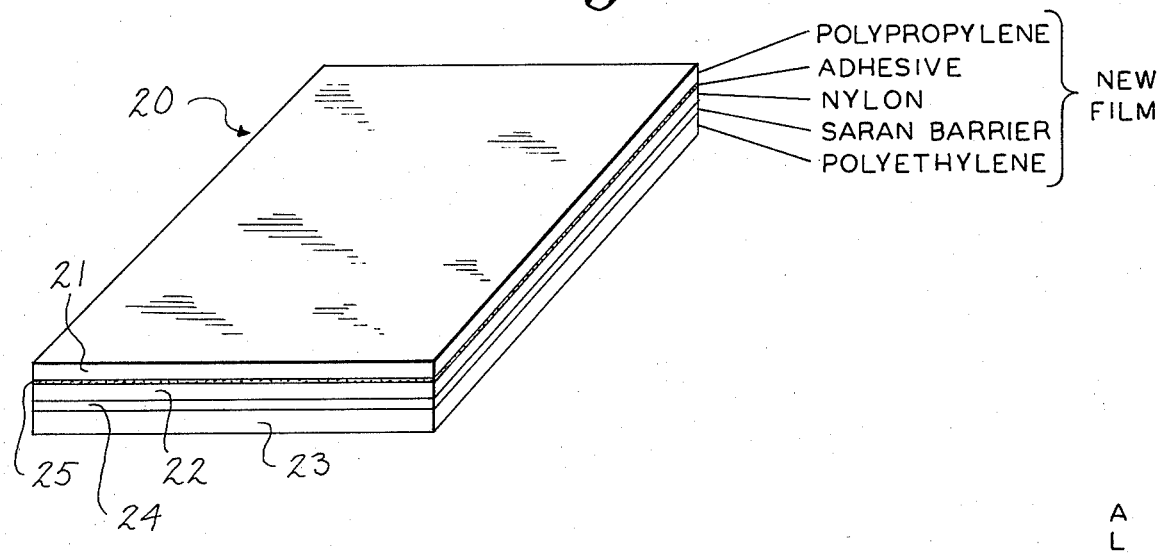
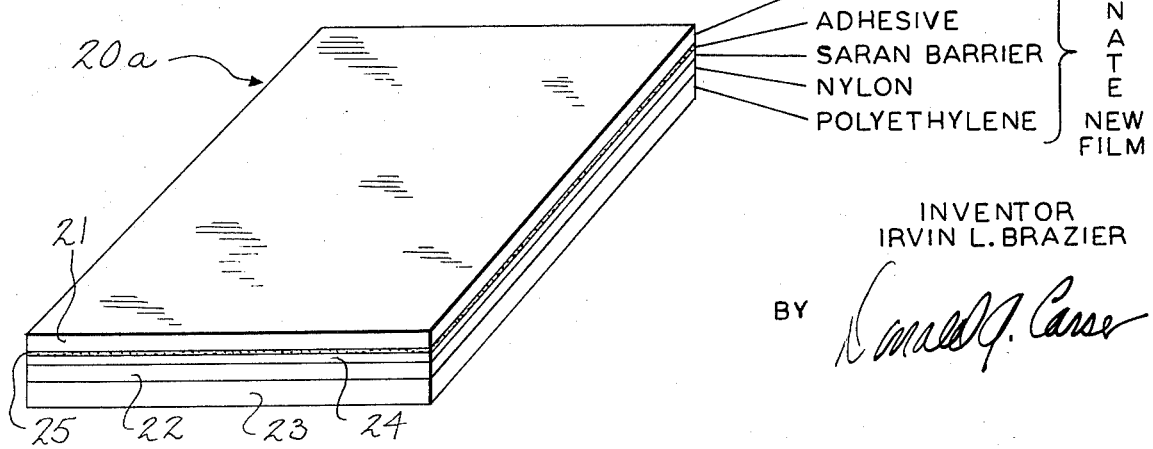
INVENTOR
IRVIN L. BRAZIER

FLEXIBLE PACKAGING FILM

BACKGROUND OF THE INVENTION

1. Field

This invention relates generally to the field of composite flexible packaging films which include layers of nylon and biaxially oriented polypropylene.

2. Prior Art

Biaxially oriented polypropylene offers several important properties which are often desirable in a flexible packaging film, one of them being excellent flex crack resistance, which is particularly important when the flexible film is to be converted into pouch or bag form or wrapped about articles. Nylon is a tough extensible film which can provide high puncture resistance and durability combined with stretchability or extensibility, thereby rendering it a desirable component of a multiple layer packaging films.

One specific field of use in which the foregoing properties of biaxially oriented polypropylene and nylon are often important is the production of barrier films which include a saran layer as a gas barrier to reduce the transmission of oxygen and other gases.

In order to be useful as a packing film, either as a wrapping material or for conversion into containers such as pouches and bags, a heat sealable layer must be combined with the polypropylene and the nylon.

A typical prior art flexible packaging film incorporating the foregoing layers positions nylon as one of the exterior layers and a heat sealable layer as the other exterior layer, with the biaxially oriented polypropylene placed between them as an interior layer; a saran barrier layer is also included as an interior layer. A typical known film construction of this general type is disclosed in U.S. Pat. No. 3,370,972.

SUMMARY OF THE PRESENT INVENTION

I have now found that unexpected advantages are obtained by constructing multiple layer packaging films with biaxially oriented polypropylene as one exterior layer, a heat sealable layer as the other exterior layer, and with a nylon layer positioned between them as an interior layer. The heat sealable layer is a heat sealable polyolefin homopolymer or copolymer material. A saran barrier layer is included in the film as an interior layer, most usefully between the heat sealable exterior layer and the nylon interior layer, but optionally it can be positioned between the polypropylene exterior layer and the nylon interior layer.

Packages are formed from the film by folding it in any desired manner and using the heat sealable layer for joining the film to itself or to other films or materials. Specifically, I have found that my new film provides a flexible packaging film that has high mechanical strength combined with extensibility. These new advantages will be demonstrated in the following description by reference to comparative tests of packages made with the film of this invention to packages made with prior art films in which the nylon forms an exterior layer and the polypropylene is an interior layer.

Some of the general objects of this invention are to provide a new flexible packaging film employing nylon and polypropylene; to provide a film of nylon and polypropylene which can form packages of high compression strength; and to provide a nylon and polypropylene packaging film which is especially useful for the production of gas-filled packages. A more specific object is to provide the particular film constructions hereinafter described and claimed.

DESCRIPTION OF THE DRAWINGS

The following description is made with reference to the accompanying drawings, in which:

FIG. 1 is a perspective view of a sheet of prior art packaging film incorporating nylon, polypropylene and heat sealable layers;

FIG. 2 is a perspective view of a sheet of film of the present invention; and

FIG. 2a is a perspective view of an alternate form of the film of this invention.

DESCRIPTION OF THE PREFERRED EMBODIMENTS

FIG. 1 depicts a typical prior art film incorporating nylon and polypropylene. A sheet 10 of film is illustrated which includes a nylon layer 11 as one exterior layer, a layer 12 of biaxially oriented polypropylene as an interior layer of the film, and a heat sealable layer 13 of polyethylene as the other exterior layer. A saran barrier layer 14 is positioned between the layers 12 and 13, and an adhesive layer 15 may be included between the nylon and the polypropylene to firmly joint the two films together. Each layer is to be firmly joined to its adjacent layer, for which purpose such adhesives, primers, treatment, etc., as commonly used in the converting art may be used as required with the specific materials employed in the film.

FIG. 2 illustrates a sheet 20 of film according to the present invention. Biaxially oriented polypropylene forms an exterior layer 21, nylon is an interior layer 22, and polyethylene forms an exterior heat sealable layer 23. A saran barrier layer 24 is positioned between the nylon layer 22 and the heat sealable layer 23. An adhesive layer 25 joins the polypropylene exterior layer 21 to the nylon interior layer 22. The saran barrier layer may be positioned between the polypropylene and the nylon layers as illustrated by the alternate embodiment of FIG. 2a wherein a sheet 20a is shown as having the saran barrier layer 24 positioned between the polypropylene exterior layer 21 and the nylon interior layer 22, with adhesive layer 25 joining the polypropylene to the saran layer.

The following examples demonstrate certain unexpected advantages obtained with the film construction of this invention in which nylon is an interior layer between polypropylene and heat sealable exterior layers.

EXAMPLE 1

A film according to FIG. 2 was made using the following layers:

1. Exterior layer 21 — a 0.65 mil thick film of biaxially oriented polypropylene;
2. Adhesive layer 25 — a 0.1 mil thick layer of heat sealable, low density non-barrier type saran;
3. Interior layer 22 — a 0.65 mil thick film of nylon 6;
4. Barrier layer 24 — a 0.1 mil thick layer of non-heat sealable saran of high density designed as an oxygen barrier;
5. Exterior layer 23 — a 2.0 mil thick layer of low density polyethylene film.

The film of the above construction is identified in this example as the FIG. 2 film. The same materials were used to manufacture a film according to FIG. 1 which is identified hereinafter as the FIG. 1 film and had the following structure:

1. Exterior layer 10 — a 0.65 mil thick nylon 6;
2. Adhesive layer 11 — a 0.1 mil thick layer of heat sealable, non-barrier type saran;
3. Interior layer 12 — a 0.65 mil thick layer of biaxially oriented polypropylene film;
4. Barrier layer 14 — a 0.1 mil thick layer of non-heat sealable saran of high density designed as an oxygen barrier, and
5. Exterior layer 15 — a 2.0 mil thick layer of low density polyethylene film.

Pouches were made from 14 inches × 17½ inches sheets of each of the above films by folding the sheets into a tube, forming a fin-type longitudinal seam, and closing the ends by means of transverse heat seals. The polyethylene heat sealable layer of adjacent plys was joined to itself to form the heat seal seams. Before they were sealed completely shut, each package was filled with approximately 1800 milliliters of air. The air-filled packages were subjected to a compression test using a Tinius-Olsen beam type tensile and compression tester employing a crosshead speed of ¼ inch per minute. The compressive load at which the packages ruptured was noted and the following data obtained:

occurred with the packages made from the FIG. 2 films. This unexpected turnabout in results is not fully understood because the same film materials and the same adhesives were used in the manufacture of the two films tested in this example. It is theorized that positioning the nylon layer as an interior layer of the construction places the two most extensible plys (the nylon and the heat sealable layer) adjacent to each other and thereby increases the resistance of the packages to compression failures. In any event, it appears that the order of arrangement of the layers in the FIG. 2 film of this invention provides a synergistic-like enhancement of the compressive strength of packages made from the film.

EXAMPLE 2

The two films of example 1 were subjected to a bursting test by forming fin-seam back seal type pouches 6 inches by 10 inches, and air filling each of them to approximately 1¾ inches thick. Each pouch was placed in a vacuum cell and the vacuum was gradually increased until the bag ruptured. The vacuum level at rupture was noted and is shown in the following table:

Table I

| | (Compression Tests) | | |
|---|---|---|---|
| | FIG. 2 FILM | | FIG. 1 FILM |
| Sample No. | Compression force at Failure | Sample No. | Compression force at Failure |
| 1 | 1,880 pounds | 7 | 780 pounds |
| 2 | 1,900 pounds | 8 | 610 pounds |
| 3 | 3,070 pounds | 9 | 420 pounds |
| 4 | 1,780 pounds | 10 | 740 pounds |
| 5 | 2,900 pounds | | |
| 6 | 2,330 pounds | | |
| | Average - 2,210 pounds | | Average - 640 pounds |

Table II

| | (Burst Tests) | | |
|---|---|---|---|
| | FIGS. 2 FILM | | FIG. 1 FILM |
| Sample No. | Vacuum at Rupture | Sample No. | Vacuum at Rupture |
| 11 | 18.0 inches | 14 | 11.0 inches |
| 12 | 22.5 inches | 15 | 16.5 inches |
| 13 | 17.5 inches | 16 | 16.5 inches |
| | Average — 19.3 inches | | Average — 14.7 inches |

The compression test results reported in Table I demonstrate that the FIG. 2 film according to this invention formed packages which were about 3½ times as strong in compression as similar packages formed from the FIG. 1 prior art film. This remarkable increase in compressive strength has important applications in packaging. All of the samples set forth in Table i were compression loaded until the packages ruptured, and the nature of the rupture was examined in each instance. It was noted that the failures of the packages made with the FIG. 1 film were delamination failures in which the outer (nylon) ply delaminated from the other plys of the film; in contrast, no delamination of the outer ply The three sample packages made from the FIG. 1 film ruptured at an average vacuum of 14.7 inches. in contrast, three packages made from the FIG. 2 film ruptured at an average vacuum of 19.3 inches, representing a marked increase in the burst strength of the packages. The pouches from the FIG, 1 film failed by delamination of the outer ply, but no delamination failures were found with the pouches of the FIG. 2 film.

Flexible packaging films incorporating the present invention are useful for a variety of packaging application. They are ideally suited for the packaging of materials which evolve a gas, for example coffee, because of the ability of the pouches to withstand high compressive strength and because of their high burst strength. Such packages will often be gas flushed, i.e. filled with an inert gas such as nitrogen or carbon dioxide, or a mixture of two or more inert gases. The films may be used to package materials which require a high strength package, such as dried and powdered mashed potatoes, or materials which require high oxygen barrier packages, such as freeze dried coffee. Additionally, the films may be used for the packaging of non-food articles such as electronic devices that should be protected from moisture and may be kept in a nitrogen-atmosphere package. The films may be heat sealed at temperatures of 250°F to 350°F using normal sealing pressures in the range of 10 to 150 psi and dwell times of 1/10 to ½ second. The present films can be transparent or opaque as desired.

For most packaging uses, the biaxially oriented polypropylene layer should have a thickness of at least 0.5 mils and may be up to 4 or 5 mils thick or as thick as may be desired. The nylon layer should be at least 0.5 mils thick, with a 0.75 – 1.0 mil being a preferred operable range, although, again other thicknesses may be used. The nylon layer may be any of the usual types of film grade nylon polyamides including nylon 4, nylon 6, nylon 66, nylon 610, nylon 7, nylon 9 and nylon 11. The saran barrier layer may be as thick as necessary and/or of the required composition to give an oxygen permeability rate of less than about 0.5 CC/100 sq. in/24 hrs. at 1 atmosphere and 72°F. The term saran is defined herein as homopolymers and interpolymers of vinylidene chloride; the commercial sarans generally comprise a binary or ternary interpolymer having 50% or more vinylidene chloride and the balance one or more copolymerizable monomers such as vinyl chloride, alkyl methacrylates and acrylates, acrylonitrile, and acrylic acid or methacrylic acid. Other saran interpolymers of vinylidene chloride may also be employed, particularly those containing at least 25 weight percent of vinylidene chloride in the polymerized molecule and the balance one or more other monoethylenically unsaturated monomers that are copolymerizable with vinylidene chloride.

The heat sealable layer is to comprise a layer of a heat sealable polyolefin material, and may be an olefin homopolymer or copolymer. Low, medium and high density polyethylenes; ethylene-vinyl acetate copolymers; and ethylene-ethylacrylate copolymers are useful materials for this layer. The thickness of the heat seal layer is determined by the package size and the type of product; thicknesses of at least 1.0 mil, and expecially in the range of 2.0 to 3.0 mils, are suitable for most applications. The adhesive for joining the polypropylene to the nylon can be any of various types of adhesives including: thermoplastic adhesives such as polyethylene, polyethylene copolymers, isobutylene rubber and polyvinyl acetate; contact adhesives such as rubber cement and dry bonding adhesives; and thermosetting adhesives such as modified polyesters, polyurethane systems, epoxies and cyanoacrylates. It is to be understood that various changes from the specific embodiments of this invention herein disclosed may be made which will not constitute a departure from the present invention and which are intended to be covered by the claims.

I claim:

1. A flexible packaging film comprising multiple layers firmly joined to one another to form a composite film construction, including in combination:
    1. a first exterior layer consisting of biaxially oriented polypropylene;
    2. a second exterior layer consisting of a heat sealable polyolefin material; and
    3. an interior layer consisting of nylon positioned between the first and second exterior layers, the film characterized in that the second exterior layer and the interior layer are each more extensible than the first layer to provide a film particularly suitable for making gas-filled packages resistant to compressive failure and burst failure.

2. A flexible packaging film according to claim 1 further including:
    a saran barrier layer positioned between the first and second exterior layers.

3. A flexible packaging film according to claim 1, wherein;
    the second exterior layer is a heat sealable polyethylene homopolymer, ethylene-vinylacetate copolymer, or ethylene-ethylacrylate copolymer.

* * * * *